US010391390B2

(12) United States Patent
Tang et al.

(10) Patent No.: US 10,391,390 B2
(45) Date of Patent: Aug. 27, 2019

(54) METHOD FOR LOCKING TARGET IN GAME SCENARIO AND TERMINAL (71) Applicant: Tencent Technology (Shenzhen) Company Limited, Shenzhen (CN)

(72) Inventors: Yong Tang, Shenzhen (CN); Changyan Liao, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 85 days.

(21) Appl. No.: 15/703,623

(22) Filed: Sep. 13, 2017

(65) Prior Publication Data
US 2018/0001189 A1 Jan. 4, 2018

Related U.S. Application Data (63) Continuation-in-part of application No. PCT/CN2016/074329, filed on Feb. 23, 2016.

(30) Foreign Application Priority Data

Jun. 16, 2015 (CN) .......................... 2015 1 0334941

(51) Int. Cl.
A63F 13/00 (2014.01)
A63F 13/2145 (2014.01)
(Continued)

(52) U.S. Cl.
CPC ........ *A63F 13/2145* (2014.09); *A63F 13/213* (2014.09); *A63F 13/42* (2014.09);
(Continued)

(58) Field of Classification Search
None
See application file for complete search history.

(56) References Cited

U.S. PATENT DOCUMENTS 6,736,724 B1 * 5/2004 Erikawa .................. A63F 13/10
463/1
2006/0252531 A1 * 11/2006 Kando .................... A63F 13/10
463/30
(Continued)

FOREIGN PATENT DOCUMENTS

CN 203075637 U 7/2013
CN 103383598 A 11/2013
(Continued)

OTHER PUBLICATIONS

Tencent Technology, ISRWO, PCT/CN2016/074329, Apr. 28, 2016, 9 pgs.

(Continued)

*Primary Examiner* — Lawrence S Galka
(74) *Attorney, Agent, or Firm* — Morgan, Lewis & Bockius LLP (57) ABSTRACT A method is performed at a terminal for locking a target in a game application, the method comprising: obtaining input gesture information from a user on an operation interface of a game application; recognizing the gesture information to obtain a switching instruction of the game application corresponding to the gesture information; selecting an object category of virtual characters according to the switching instruction; locking a target virtual character in the object category according to a preset rule and performing an operation on the target virtual character; and after performing the operation, automatically repeating the locking and the performing operations on a next target virtual character in the object category until finishing a last virtual character in the object category.

19 Claims, 8 Drawing Sheets (51) Int. Cl.
*A63F 13/426* (2014.01)
*A63F 13/822* (2014.01)
*G06F 3/0484* (2013.01)
*A63F 13/213* (2014.01)
*A63F 13/42* (2014.01)
*G06F 3/0488* (2013.01)

(52) U.S. Cl.
CPC .......... *A63F 13/426* (2014.09); *A63F 13/822* (2014.09); *G06F 3/04842* (2013.01); *G06F 3/04883* (2013.01)

(56) References Cited

U.S. PATENT DOCUMENTS

2008/0188302 A1* 8/2008 Haga ................ A63F 13/10
  463/31

2010/0302138 A1 12/2010 Poot et al.
2015/0231509 A1* 8/2015 McMain, II .......... A63F 13/837
  463/31

FOREIGN PATENT DOCUMENTS

| | | |
|---|---|---|
| CN | 103890695 A | 6/2014 |
| CN | 104635925 A | 5/2015 |
| CN | 105302434 A | 2/2016 |
| JP | 2010005209 A | 1/2010 |
| JP | 2010017395 A | 1/2010 |

OTHER PUBLICATIONS

Tencent Technology, IPRP, PCT/CN2016/074329, Dec. 19, 2017, 8 pgs.

* cited by examiner

METHOD FOR LOCKING TARGET IN GAME SCENARIO AND TERMINAL

RELATED APPLICATIONS

This application is a continuation-in-part application of PCT Patent Application No. PCT/CN2016/074329, entitled "METHOD FOR LOCKING TARGET IN GAME SCENARIO AND TERMINAL" filed on Feb. 23, 2016, which claims priority to Chinese Patent Application No. 201510334941.3, entitled "METHOD FOR LOCKING TARGET IN GAME SCENARIO AND APPARATUS" filed on Jun. 16, 2015, both of which are incorporated by reference in their entirety.

FIELD OF THE TECHNOLOGY

The present disclosure relates to the field of data processing, and in particular, to a method for locking a target in a game application and a terminal.

BACKGROUND OF THE DISCLOSURE

The rapid development of computer technologies brings much convenience to people' life, and greatly improve people's life quality. As people are enjoying convenient life, they sometimes also need some entertainment activities. Therefore, various game products are emerging. In a conventional game product scenario, to control a virtual character to perform information interaction with an object in the scenario, a user first needs to lock the object, and it is needed in some cases to perform information interaction with multiple objects, and the user needs to manually operate a switching button among the multiple objects to lock the multiple objects, resulting in inconvenient operations.

SUMMARY

Based on this, for the problem that operations are inconvenient due to frequent operation of a switching button during conventional information interaction among virtual characters, it is needed to provide a method for locking a target in a game application, which can improve convenience in operation.

In addition, it is also needed to provide a method for locking a target in a game application, which can improve convenience in operation.

A method for locking a target in a game application includes the following steps:

obtaining input gesture information in an operation interface of a game application;

recognizing the gesture information to obtain a switching instruction corresponding to the gesture information;

switching to a corresponding object category according to the switching instruction; and locking a target in the object category according to a preset rule.

A terminal includes a storage medium and a processor, where the storage medium stores instructions, and when executed by the processor, the instructions cause the processor to perform the following steps:

obtaining input gesture information in an operation interface of a game application;

recognizing the gesture information to obtain a switching instruction corresponding to the gesture information;

switching to a corresponding object category according to the switching instruction; and locking a target in the object category according to a preset rule.

According to the foregoing method for locking a target in a game application and the terminal, gesture information is obtained, a switching instruction corresponding to the gesture information is obtained through recognition, a corresponding object category is switched to according to the switching instruction, and then a target in the object category is locked according to a preset rule. Compared with a conventional click operation, inputting gesture information is more convenient, which improves convenience in operation. A quantity of operation times is reduced by locking a target according to a preset rule, which further improves convenience in operation.

DESCRIPTION OF EMBODIMENTS

To make the objective, technical solutions, and advantages of the present disclosure clearer, the present disclosure is further described in detail with reference to the accompanying drawings and embodiments. It should be understood that, the specific embodiments described herein are merely intended to explain the present disclosure, rather than limit the present disclosure.

It may be understood that, terms such as "first" and "second" used in the present disclosure may be used to describe various elements herein, but these elements are not limited by these terms. These terms are merely used to differentiate a first element from another element. For example, without departing from the scope of the present disclosure, a first client may be referred to a second client, and similarly, a second client may be referred to as a first client. Both the first client and the second client are clients, but they are not a same client.

Figure 1A:
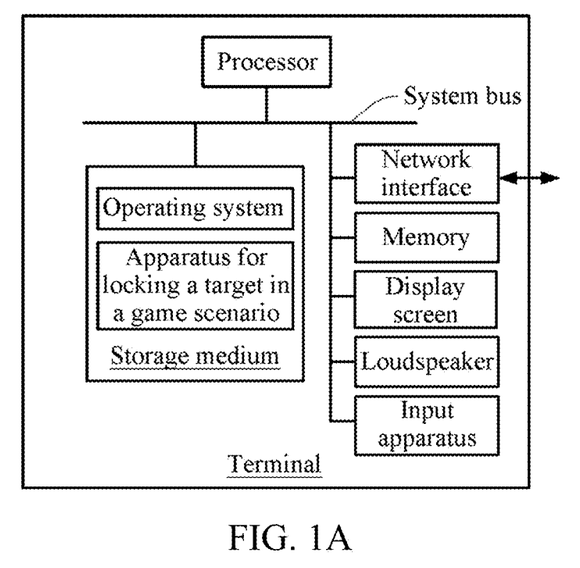
FIG. 1A is a schematic diagram of an internal structure of a terminal according to an embodiment.

FIG. 1A is a schematic diagram of an internal structure of a terminal according to an embodiment. As shown in FIG. 1A, the terminal includes a processor, a non-transitory computer readable storage medium, a memory, a network interface, a sound collecting apparatus, a display screen, a loudspeaker, and an input apparatus that are connected by using a system bus. An operating system is stored in the storage medium of the terminal, and an apparatus for locking a target in a game application is further stored in the storage medium, where the apparatus for locking a target in a game application is configured to implement a method for locking a target in a game application. The processor is used for providing computational and control capabilities to support operation of the entire terminal. The memory in the terminal is used for providing an environment for functioning of the apparatus for locking a target in a game application in the storage medium, and the network interface is used for network communication with a server, for example, uploading data of a virtual character to the server and receiving related data of the virtual character that is returned by the server. The display screen of the terminal may be a liquid crystal screen, an electronic ink display screen, or the like. The input apparatus may be a touch layer covered on the display screen, or may be buttons, a trackball, or a touchpad disposed on a housing of the terminal, or may be an external keyboard, touchpad, or mouse. The terminal may be a mobile phone, a tablet computer, or a personal digital assistant. It may be understood by a person skilled in the art that, the structure shown in FIG. 1A is merely a block diagram of a structure of parts related to the solutions in the present application, and does not form a limitation on a terminal to which the solutions in the present application are applied. A specific terminal may include more or less components than those shown in the figure, or combine some components, or have a different component arrangement.

Figure 1B:
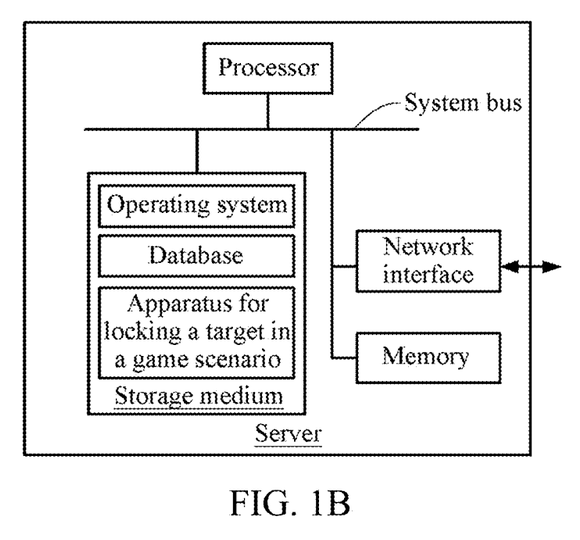
FIG. 1B is a schematic diagram of an internal structure of a server according to an embodiment.

FIG. 1B is a schematic diagram of an internal structure of a server according to an embodiment. As shown in FIG. 1B, the server includes a processor, a non-transitory computer readable storage medium, a memory, and a network interface that are connected by using a system bus. An operating system, a database, and an apparatus for locking a target in a game application are stored in the storage medium of the server, where the database stores game application data and virtual character related data, and the apparatus for locking a target in a game application is configured to implement a method for locking a target in a game application that is applicable to the server. The processor of the server is used for providing computational and control capabilities to support operation of the entire server. The memory of the server is used for providing an environment for functioning of the apparatus for locking a target in a game application in the storage medium. The network interface of the server is used for communication with an external terminal through a network connection, for example, receiving data of a virtual character that is uploaded by the terminal and sending data of other virtual characters to the terminal. The server may be implemented by using an independent server or a server cluster included of multiple servers. It may be understood by a person skilled in the art that, the structure shown in FIG. 1B is merely a block diagram of a structure of parts related to the solutions in the present application, and does not form a limitation on a server to which the solutions in the present application are applied. A specific server may include more or less components than those shown in the figure, or combine some components, or have a different component arrangement.

Figure 2:
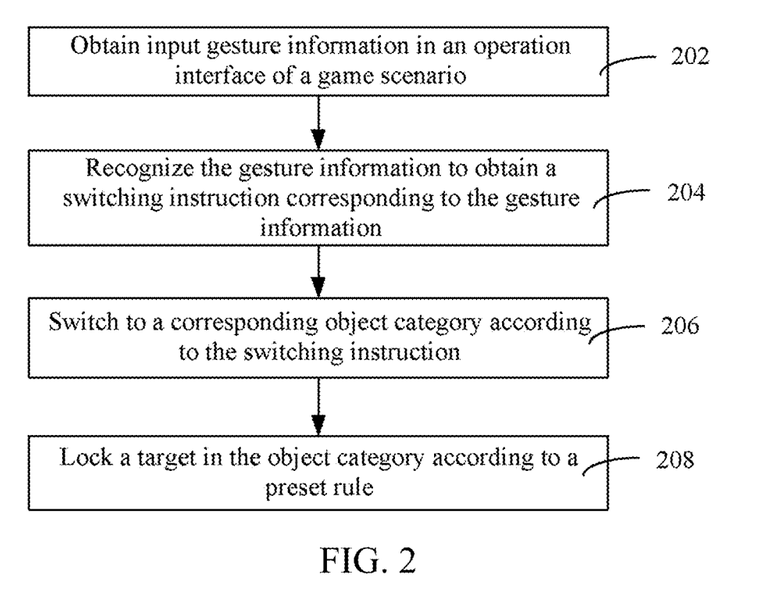
FIG. 2 is a flowchart of a method for locking a target in a game application according to an embodiment.

FIG. 2 is a flowchart of a method for locking a target in a game application according to an embodiment. The method for locking a target in a game application in FIG. 2 is performed on a terminal. As shown in FIG. 2, the method for locking a target in a game application includes the following steps:

Step 202: Obtain input gesture information in an operation interface of a game application.

Specifically, the input gesture information is obtained in the operation interface of the game application by using an input device such as a touch screen, or the input gesture information is collected by using a collecting apparatus such as a camera. The input gesture information may be some preset gestures. For example, sliding up on the touch screen is corresponding to a switching instruction, and sliding down is corresponding to another switching instruction.

To take advantage of gesture recognition, a gesture recognition database needs to be built in advance, and correspondences between gesture information and instructions need to be established in the gesture recognition database for subsequent recognition. The gesture recognition database may be built in advance, and predefined gesture information and corresponding instructions are stored in the gesture recognition database, and then the database is periodically updated and improved.

Step 204: Recognize the gesture information to obtain a switching instruction corresponding to the gesture information.

Specifically, the gesture information is recognized, and the recognized gesture information and gesture information in the gesture recognition database are compared, and after same gesture information is found, a corresponding switching instruction is found according to a correspondence between the gesture information and the instruction.

Step 206: Switch to a corresponding object category according to the switching instruction.

Specifically, an object is a virtual character in the game application. In some game applications, virtual characters may include a minion, a beast, a hero, a boss, and others. Each type of virtual character may be classified into different levels. For example, a minion may be classified as a footman or an archer. Virtual characters may be classified according to different levels. Beasts may be classified into six levels: level 1 to level 6. In some game applications, virtual characters may include virtual figures and the like. Objects in the game application are classified in advance. For example, the objects are classified into two classes, where one class is minions and beasts, and the other class is heroes and bosses. The objects are then classified according to different levels. For example, the heroes are classified into 50 levels: level 1 to level 50. The bosses are classified into 10 levels to 20 levels.

Different switching instructions are corresponding to different object categories. Correspondences between the switching instructions and the object categories are established in advance. After a switching instruction is obtained through recognition, an object category corresponding to the switching instruction obtained through recognition is obtained according to a correspondence between the switching instruction and the object category. For example, gesture information is sliding up, and a switching instruction obtained through recognition is switching to a hero/boss, and a hero/boss category is switched to according to the switching instruction.

Step 208: Lock a target in the object category according to a preset rule.

Specifically, the preset rule is a condition that is set in advance according to an actual need. The preset rule may be locking targets according to distances from near to far, locking targets according to attribute values of the targets from small to large, or the like.

The attribute values of the targets may be blood, and the targets are locked according to blood from less to more.

The target in the object category means a virtual character in the object category.

In addition, data generated by a target in a locked object category may also be uploaded to a server to realize data synchronization.

According to the foregoing method for locking a target in a game application, gesture information is obtained, a switching instruction corresponding to the gesture information is obtained through recognition, a corresponding object category is switched to according to the switching instruction, and then a target in the object category is locked according to a preset rule. Compared with a conventional click operation, inputting gesture information is more convenient, which improves convenience in operation. A quantity of operation times is reduced by locking a target according to a preset rule, which further improves convenience in operation.

Figure 3:
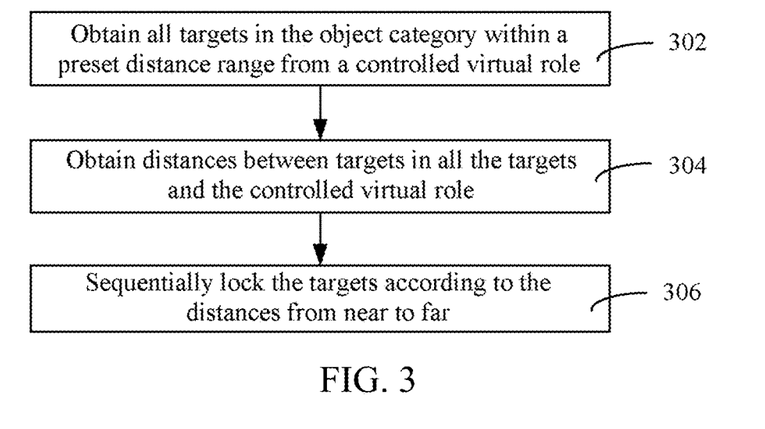
FIG. 3 is a specific flowchart of locking a target in an object category according to a preset rule according to an embodiment.

FIG. 3 is a specific flowchart of locking a target in an object category according to a preset rule according to an embodiment. As shown in FIG. 3, the step of locking a target in the object category according to a preset rule includes:

Step 302: Obtain all targets in the object category within a preset distance range from a controlled virtual character.

Specifically, using a position at which the controlled virtual character is located as a center, all targets in the object category that fall within a preset distance range from the center are obtained. For example, the object category is hero/boss, and all heroes and bosses within the preset distance range are obtained.

Step 304: Obtain distances between targets in all the targets and the controlled virtual character.

Specifically, distances between the targets and the controlled virtual character are obtained. There exist three-dimensional coordinates in a map for the game application. Coordinates (x1, y1, z1) of the virtual character and coordinates (x2, y2, z2) of the targets are obtained, and the distances between the virtual character and the targets are calculated according to the coordinates of them.

Step 306: Sequentially lock the targets according to their respective distances from near to far.

Specifically, after the distances between the targets and the controlled virtual character are obtained, the targets may be sorted according to their respective distances from near to far or from far to near, and then the targets may be sequentially locked according to their respective distances from near to far. For targets at a same distance, one of the targets at the same distance is randomly locked.

In addition, a target that has been locked is marked by using a first indicator, and a target that has not been locked is marked by using a second indicator visually distinct from the first indicator. The first indicator and the second indicator may be set according to a need. For example, the first indicator may be 1 and the second indicator may be 0, or the first indicator is 0 and the second indicator is 1, or the first indicator is % and the second indicator is *. In some embodiments, the first indicator and the second indicator are set to be in different colors.

After distances between targets and a controlled virtual character are obtained, the targets are sequentially locked according to their respective distances from near to far, without the need of manual control and operation of a user, bringing convenient operations.

Figure 4:
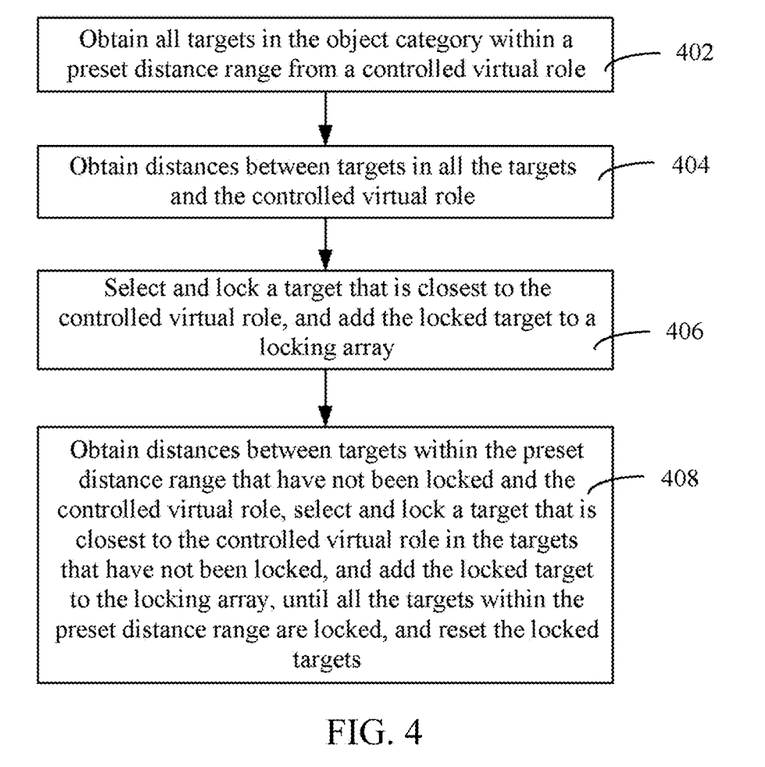
FIG. 4 is a specific flowchart of locking a target in an object category according to a preset rule according to another embodiment.

FIG. 4 is a specific flowchart of locking a target in an object category according to a preset rule according to another embodiment. As shown in FIG. 4, the step of locking a target in the object category according to a preset rule includes:

Step 402: Obtain all targets in the object category within a preset distance range from a controlled virtual character.

Specifically, using a position at which the controlled virtual character is located as a center, all targets in the object category that fall within a preset distance range from the center are obtained. For example, the object category is hero/boss, and all heroes and bosses within the preset distance range are obtained. The preset distance range means a maximum distance range within which the controlled virtual character can perform information interaction.

Step 404: Obtain distances between targets in all the targets and the controlled virtual character.

Specifically, distances between the targets and the controlled virtual character are obtained. There exist three-dimensional coordinates in a map for the game application. Coordinates (x1, y1, z1) of the virtual character and coordinates (x2, y2, z2) of the targets are obtained, and the distances between the virtual character and the targets are calculated according to the coordinates of them.

Step 406: Select and lock a target that is closest to the controlled virtual character, and add the locked target to a locking array.

Specifically, after the distances between the targets and the controlled virtual character are obtained, the targets may be sorted according to their respective distances from near to far or from far to near, and then a target that is closest to the controlled virtual character is selected and locked, and the locked target is added to the locking array.

A target that has been locked is marked by using a first indicator, and a target that has not been locked is marked by using a second indicator visually distinct from the first indicator. The first indicator and the second indicator may be set according to a need. For example, the first indicator may be 1 and the second indicator may be 0, or the first indicator is 0 and the second indicator is 1, or the first indicator is % and the second indicator is *. A target that has been locked and a target that has not been locked are differentiated by using the first indicator and the second indicator, bringing convenient operations and easy identification.

Step 408: Obtain distances between targets within the preset distance range that have not been locked and the controlled virtual character, select and lock a target that is closest to the controlled virtual character in the targets that have not been locked, and add the locked target to the locking array, until all the targets within the preset distance range are locked, and reset the locked targets.

Specifically, after a locked target is added to the locking array, distances between targets within the preset distance range that have not been locked and the controlled virtual character are calculated, and then a target that is closest to the controlled virtual character in the targets that have not been locked is selected and locked.

Figure 5:
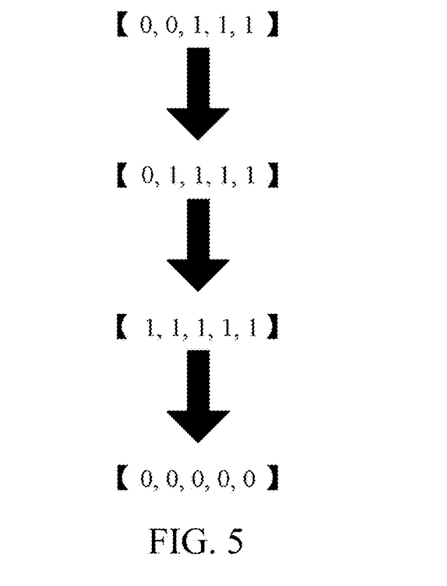
FIG. 5 is a flowchart of changing of locked targets in an array.

FIG. 5 is a flowchart of changing of locked targets in an array. As shown in FIG. 5, the first indicator 1 indicates that a target has been locked, and the second indicator 0 indicates that a target has not been locked. First, targets marked with 0 are obtained and placed before targets marked with 1, and the targets marked with 0 are sorted according to distances from the virtual character from near to far, by which two targets marked with 0 and three targets marked with 1, that is, 【0, 0, 1, 1, 1】, are obtained, and the first target marked with 0 is closest to the virtual character, and the second target marked with 0 is further from the virtual character. Then, after the first virtual character marked with 0 is locked, the indicator 0 of the virtual character is modified as 1, and the target is placed at the back of the array, thereby obtaining one target marked with 0 and four targets marked with 1, that is, 【0, 1, 1, 1, 1】. Then, the single target that has not been locked is locked, obtaining five targets marked with 1, that is, 【1, 1, 1, 1, 1】. After the targets are all locked, the targets are reset, and the first indicators 1 of all the targets are modified as the second indicator 0, thereby obtaining five targets marked with 0, that is, 【0, 0, 0, 0, 0】, that are to be locked again.

In an embodiment, the foregoing method for locking a target in a game application further includes: when a preset condition is satisfied, switching from locking a current target to locking a next target.

The preset condition includes any one of the following:

(1) A preset quantity of interaction times is reached.

Specifically, the preset quantity of interaction times may be set according to a need, for example, to 3 times or 5 times.

(2) A preset interaction time is reached.

Specifically, the preset interaction time may be set according to a need, for example, to 2 seconds or 5 seconds.

(3) A currently locked target is lost or disappears.

Specifically, that the currently locked disappears may be that the currently locked target dies, or the like.

(4) A switching instruction is obtained.

Specifically, gesture information input by a user is obtained, the gesture information is recognized to obtain a switching instruction, and a next target is locked according to the switching instruction.

In an embodiment, the step of obtaining input gesture information in an operation interface of a game application includes: obtaining, in the operation interface of the game application, gesture information that is formed by a sliding operation on a touch screen.

Specifically, gesture information that is formed by a sliding operation on the touch screen is corresponding to a switching instruction. For example, first gesture information is formed by a sliding operation in a first direction on the touch screen, the first gesture information is recognized to obtain a corresponding first switching instruction, and a corresponding first object category is switched to according to the first switching instruction. Second gesture information is formed by a sliding operation in a second direction on the touch screen, the second gesture information is recognized to obtain a corresponding second switching instruction, and a corresponding second object category is switched to according to the second switching instruction. Similarly, correspondences between gesture information formed by multiple sliding operations and switching instructions may further be set, and each switching instruction is corresponding to an object category. The first gesture information may be sliding up, and the second gesture information may be sliding down.

In an embodiment, the foregoing method for locking a target in a game application further includes: after the switching to a corresponding object category according to the switching instruction, obtaining, in the operation interface of the game application, horizontal gesture information that is formed by a sliding operation on the touch screen; recognizing the horizontal gesture information to obtain a screening instruction corresponding to the horizontal gesture information; screening out corresponding level targets from the corresponding object category according to the screening instruction; and locking a target in the level targets according to a preset rule.

Specifically, the horizontal gesture information means gesture information that is generated after the corresponding object category is switched to, and is different from gesture information for switching an object category. For example, the horizontal gesture information may be sliding a circle on the touch screen indicating level 1 or level 1 to level 5. That is, the horizontal gesture information may be corresponding to a level or be corresponding to a level range. This may be set according to a need. The horizontal gesture information may also be digital gesture information formed by sliding on the touch screen that indicates a corresponding level. For example, when "1" is formed, it indicates level 1, and when "10" is formed, it indicates level 10.

Corresponding horizontal gesture information is recognized, a screening instruction corresponding to the horizontal gesture information is obtained, corresponding level targets are screened out, and then a target in the level targets is locked according to a preset rule. The preset rule may be that shown in FIG. 3 or FIG. 4. Targets are screened according to different levels, and therefore a locking operation is finer and more precise.

The step of locking a target in the level targets according to a preset rule includes:

(1) obtain all targets, in the level targets, within a preset distance range from the controlled virtual character;

(2) obtain distances between targets in all the targets and the controlled virtual character; and (3) sequentially lock the targets according to their respective distances from near to far.

Alternatively, the step of locking a target in the level targets according to a preset rule includes:

(1) obtain all targets, in the level targets, within a preset distance range from the controlled virtual character;

(2) obtain distances between targets in all the targets and the controlled virtual character; and (3) select and lock a target that is closest to the controlled virtual character, and add the locked target to a locking array; and (4) obtain distances between targets within the preset distance range that have not been locked and the controlled virtual character, select and lock a target that is closest to the controlled virtual character in the targets that have not been locked, and add the locked target to the locking array, until all the targets within the preset distance range are locked, and reset the locked targets.

In some embodiments, the method for locking a target in a game application, includes: obtaining input gesture information from a user on an operation interface of a game application, wherein the game application includes multiple object categories, each object category having one or more virtual characters displayed on the operation interface, for example, the virtual character may be an enemies or a controlled virtual character in the game application that is a minion, a beast, a hero, a boss, and others; recognizing the gesture information to obtain a switching instruction of the game application corresponding to the gesture information; selecting an object category of virtual characters according to the switching instruction; locking a target virtual character in the object category according to a preset rule and performing an operation on the target virtual character, for example, locking a target virtual character means selected a target virtual character when a user do some operation on the target virtual character, such as select a virtual character and attack the virtual character, the target virtual character means the target as described in FIG. 2; and after performing the operation, automatically repeating the locking and the performing operations on a next target virtual character in the object category until finishing a last virtual character in the object category.

In some embodiments, the method of locking a target virtual character in the object category according to a preset rule and performing an operation on the target virtual character, includes: obtaining target virtual characters in the object category within a preset distance range from a controlled virtual character; obtaining a respective distance between each of the target virtual characters and the controlled virtual character; and sequentially locking the target virtual characters in the object category according to their respective distances from near to far and performing the operation on the target virtual character.

In some embodiments, the method of locking a target virtual character in the object category according to a preset rule and performing an operation on the target virtual character includes (for example, shown as FIG. 5 and FIG. 6): obtaining target virtual characters in the object category within a preset distance range from a controlled virtual character; obtaining a respective distance between each of the target virtual characters and the controlled virtual character; selecting and locking a target virtual character that is closest to the controlled virtual character in the object category, and adding the locked target virtual character to a locking array; and obtaining a respective distance between each of the target virtual characters within the preset distance range that have not been locked and the controlled virtual character, selecting and locking a target virtual character that is closest to the controlled virtual character in the target virtual characters that have not been locked, and adding the locked target virtual character to the locking array, until no target virtual character within the preset distance range remains unlocked, and resetting the locked target virtual characters in the locking array.

In some embodiments, the method of automatically repeating the locking and the performing operations on a next target virtual character in the object category until finishing a last virtual character in the object category includes: after reaching a preset number of interaction times on a current target virtual character, switching from locking the current target virtual character to locking the next target virtual character in the object category. For example, when the controlled virtual character performed the quantity of interaction times on the current target virtual character exceeded 3 times or 5 times as preset, the locking on the current target virtual character will be automatically switched to next target virtual character.

In some embodiments, the method of automatically repeating the locking and the performing operations on a next target virtual character in the object category until finishing a last virtual character in the object category includes: after the interaction on the current target virtual character reached a preset interaction time, switching from locking the current target virtual character to locking the next target virtual character in the object category. For example, when the controlled virtual character performed the interaction time on the current target virtual character exceeded 2 or 3 seconds as preset, the locking on the current target virtual character will be automatically switched to next target virtual character.

In some embodiments, the method of automatically repeating the locking and the performing operations on a next target virtual character in the object category until finishing a last virtual character in the object category includes: after the current locked target virtual character disappears from the preset distance range, switching from locking the current target virtual character to locking the next target virtual character in the object category. For example, the current locked target virtual character lost or disappear is that when the current locked target virtual character killed by a controlled virtual character or other attackers.

In some embodiments, the method for locking a target in a game application includes: marking, by using a first indicator, a target virtual character that has been locked, and marking, by using a second indicator visually distinct from the first indicator, a target virtual character that has not been locked.

In some embodiments, the method of obtaining input gesture information from a user on an operation interface of a game application includes: obtaining, in the operation interface of the game application, gesture information that is formed by a sliding operation on a touch screen.

In some embodiments, the method of after selecting an object category of virtual characters according to the switching instruction includes (for example, shown as FIG. 7): obtaining, in the operation interface of the game application, horizontal gesture information that is formed by a sliding operation on the touch screen; recognizing the horizontal gesture information to obtain a screening instruction corresponding to the horizontal gesture information, and screening out corresponding level target virtual characters from the object category according to the screening instruction; and locking a target virtual character in the level target virtual characters according to a preset rule.

Figure 6:
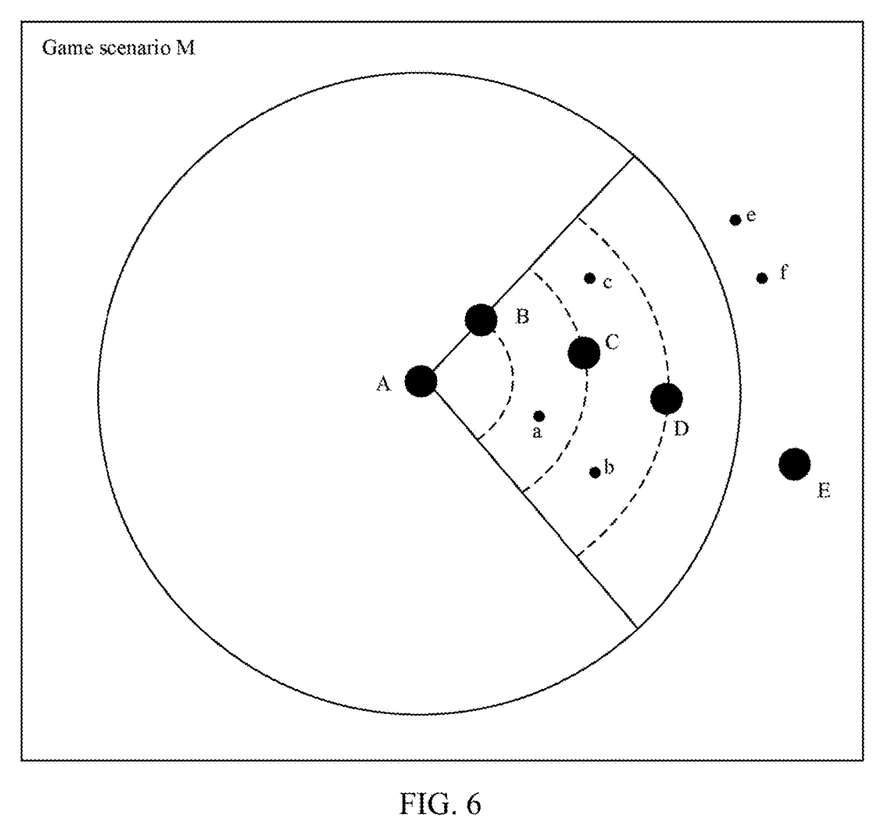
FIG. 6 is a schematic diagram of a process of locking a hero role in a game application.

To describe the foregoing method for locking a target in a game application more clearly, a process of locking targets that is applied to a controlled hero role A in a game is described below with reference to FIG. 6. As shown in FIG. 6, in a game application M, a user controls a hero role A. Within a maximum distance range (that is, a preset distance range) for information interaction by the hero role A, there exist hero roles B, C, and D (B, C, and D are opponents of A) and minion roles a, b, and c; beyond the maximum distance range, there exist a hero role E and minion roles e and f. A sliding up gesture that is input by the user in an operation interface of the game application is obtained, the sliding up gesture is recognized and a switching instruction for switching to a hero role is obtained, and the hero roles B, C, and D are switched to according to the switching instruction. A process of locking the multiple hero roles B, C, and D by the controlled hero role A includes:

(1) calculate distances between the hero roles B, C, and D and the controlled hero role A, where, for example, the maximum distance range is 4 meters, the distance between the hero role B and A is 1 meter, the distance between the hero role C and A is 2 meters, and the distance between the hero role D and A is 3 meters; and (2) sequentially lock the hero roles according to the distances from A from near to far.

Specifically, B, C, and D are sequentially locked according to an order of B-C-D. A hero role that has been locked is marked with 1, and a hero role that has not been locked is marked with 0. When B, C, and D are all marked with 1, indicators are reset to 0 to enter a locking cycle again. When a distance between a hero role and the controlled hero role A exceeds the maximum distance range, an indicator is reset to 0.

It may also be that, after the hero role B that is closest to A is locked, distances between the unlocked C and A and the unlocked D and A are calculated again, and a hero role that is closer to A is selected as a next target to be locked.

If a sliding down gesture that is input by the user in the operation interface of the game application is obtained, the sliding down gesture is recognized and a switching instruction for switching to a minion role is obtained, and the multiple minion roles a, b, and c are switched to according to the switching instruction. A process of locking the multiple minion roles a, b, and c by the controlled hero role A is the same as the process of locking the multiple hero roles B, C, and D, and details are not described herein again.

Figure 7:
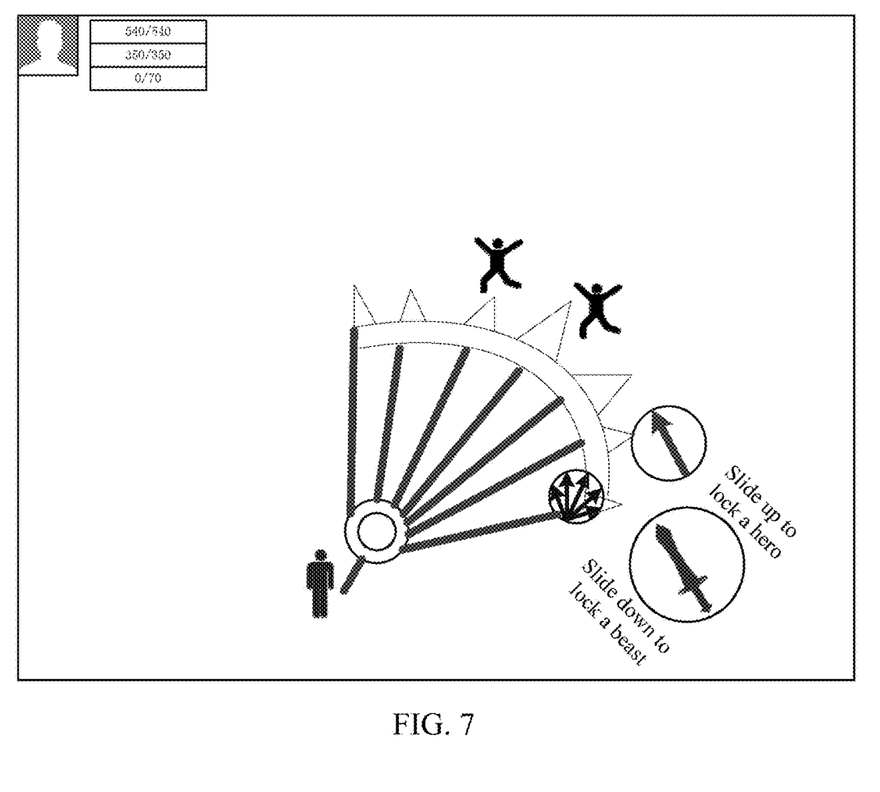
FIG. 7 is a schematic diagram of effects of switching a locked target in a game application.

A game application to which the foregoing method for locking a target in a game application is applied may be a MOBA (Multiplayer Online Battle Arena) game application. In the MOBA game application, corresponding skills, and effects, halos, and operations that assist skill release with a skill indicator are provided for a virtual character. As shown in FIG. 7, it may be indicated on the skill indicator that sliding up to switch to a hero and sliding down to switch to a minion.

Figure 8:
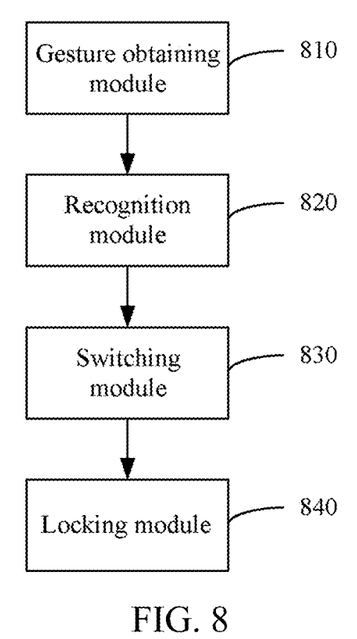
FIG. 8 is a block diagram of an internal structure of an apparatus for locking a target in a game application according to an embodiment.

FIG. 8 is a block diagram of an internal structure of an apparatus for locking a target in a game application according to an embodiment. As shown in FIG. 8, the apparatus for locking a target in a game application includes a gesture obtaining module 810, a recognition module 820, a switching module 830, and a locking module 840.

The gesture obtaining module 810 is configured to obtain input gesture information in an operation interface of a game application. Specifically, the input gesture information is obtained in the operation interface of the game application by using an input device such as a touch screen, or the input gesture information is collected by using a collecting apparatus such as a camera. The input gesture information may be some preset gestures. For example, sliding up on the touch screen is corresponding to a switching instruction, and sliding down is corresponding to another switching instruction.

To take advantage of gesture recognition, a gesture recognition database needs to be built in advance, and correspondences between gesture information and instructions need to be established in the gesture recognition database for subsequent recognition. The gesture recognition database may be built in advance, and predefined gesture information and corresponding instructions are stored in the gesture recognition database, and then the database is periodically updated and improved.

The recognition module 820 is configured to recognize the gesture information to obtain a switching instruction corresponding to the gesture information.

Specifically, the gesture information is recognized, and the recognized gesture information and gesture information in the gesture recognition database are compared, and after same gesture information is found, a corresponding switching instruction is found according to a correspondence between the gesture information and the instruction.

The switching module 830 is configured to switch to a corresponding object category according to the switching instruction.

Specifically, an object is a virtual character in the game application. In some game applications, virtual characters may include a minion, a beast, a hero, a boss, and others. Each type of virtual character may be classified into different levels. For example, a minion may be classified as a footman or an archer. Virtual characters may be classified according to different levels. Beasts may be classified into six levels: level 1 to level 6. In some game applications, virtual characters may include virtual figures and the like. Objects in the game application are classified in advance. For example, the objects are classified into two classes, where one class is minions and beasts, and the other class is heroes and bosses. The objects are then classified according to different levels. For example, the heroes are classified into 50 levels: level 1 to level 50. The bosses are classified into 10 levels to 20 levels. Different switching instructions are corresponding to different object categories. Correspondences between the switching instructions and the object categories are established in advance. After a switching instruction is obtained through recognition, an object category corresponding to the switching instruction obtained through recognition is obtained according to a correspondence between the switching instruction and the object category. For example, gesture information is sliding up, and a switching instruction obtained through recognition is switching to a hero/boss, and a hero/boss category is switched to according to the switching instruction.

The locking module 840 is configured to lock a target in the object category according to a preset rule.

Specifically, the preset rule is a condition that is set in advance according to an actual need. The preset rule may be locking targets according to distances from near to far, locking targets according to attribute values of the targets from small to large, or the like.

The attribute values of the targets may be blood, and the targets are locked according to blood from less to more.

The target in the object category means a virtual character in the object category.

According to the foregoing terminal for locking a target in a game application, gesture information is obtained, a switching instruction corresponding to the gesture information is obtained through recognition, a corresponding object category is switched to according to the switching instruction, and then a target in the object category is locked according to a preset rule. Compared with a conventional click operation, inputting gesture information is more convenient, which improves convenience in operation. A quantity of operation times is reduced by locking a target according to a preset rule, which further improves convenience in operation.

Figure 9:
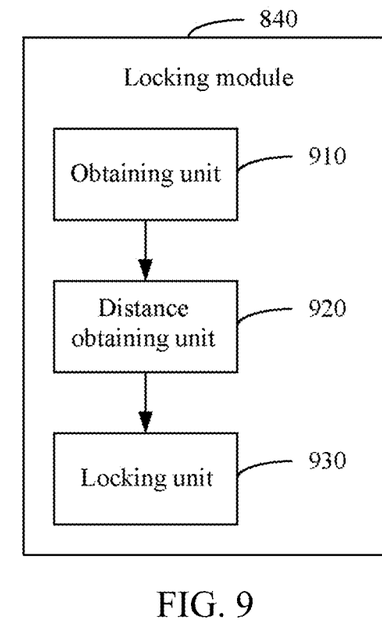
FIG. 9 is a block diagram of an internal structure of a locking module according to an embodiment.

FIG. 9 is a block diagram of an internal structure of a locking module according to an embodiment. As shown in FIG. 9, the locking module 840 includes an obtaining unit 910, a distance obtaining unit 920, and a locking unit 930.

The obtaining unit 910 is configured to obtain all targets in the object category within a preset distance range from a controlled virtual character.

Specifically, using a position at which the controlled virtual character is located as a center, all targets in the object category that fall within a preset distance range from the center are obtained. For example, the object category is hero/boss, and all heroes and bosses within the preset distance range are obtained.

The distance obtaining unit 920 is configured to obtain distances between targets in all the targets and the controlled virtual character.

Specifically, distances between the targets and the controlled virtual character are calculated. There exist three-dimensional coordinates in a map for the game application. Coordinates (x1, y1, z1) of the virtual character and coordinates (x2, y2, z2) of the targets are obtained, and the distances between the virtual character and the targets are calculated according to the coordinates of them.

The locking unit 930 is configured to sequentially lock the targets according to their respective distances from near to far.

Specifically, after the distances between the targets and the controlled virtual character are obtained, the targets may be sorted according to their respective distances from near to far or from far to near, and then the targets may be sequentially locked according to their respective distances from near to far. For targets at a same distance, one of the targets at the same distance is randomly locked.

Figure 10:
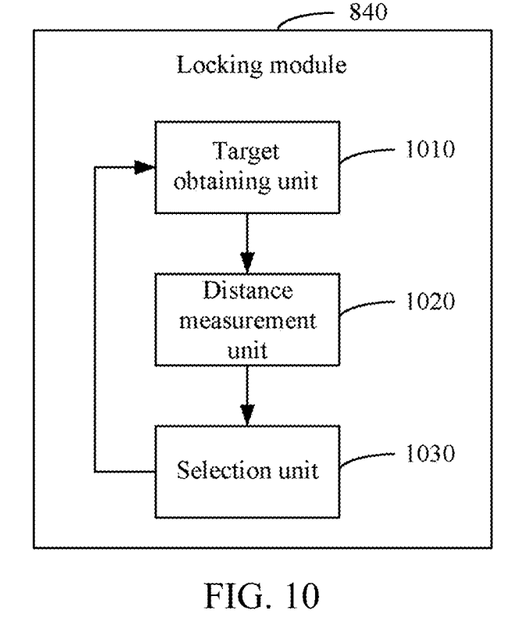
FIG. 10 is a block diagram of an internal structure of a locking module according to another embodiment.

FIG. 10 is a block diagram of an internal structure of a locking module according to another embodiment. As shown in FIG. 10, the locking module 840 includes a target obtaining unit 1010, a distance measurement unit 1020, and a selection unit 1030. The target obtaining unit 1010 is configured to obtain all targets in the object category within a preset distance range from a controlled virtual character.

Specifically, using a position at which the controlled virtual character is located as a center, all targets in the object category that fall within a preset distance range from the center are obtained. For example, the object category is hero/boss, and all heroes and bosses within the preset distance range are obtained. The preset distance range means a maximum distance range within which the controlled virtual character can perform information interaction.

The distance measurement unit 1020 is configured to obtain distances between targets in all the targets and the controlled virtual character.

Specifically, distances between the targets and the controlled virtual character are calculated. There exist three-dimensional coordinates in a map for the game application. Coordinates (x1, y1, z1) of the virtual character and coordinates (x2, y2, z2) of the targets are obtained, and the distances between the virtual character and the targets are calculated according to the coordinates of them.

The selection unit 1030 is configured to select and lock a target that is closest to the controlled virtual character, and add the locked target to a locking array.

Specifically, after the distances between the targets and the controlled virtual character are obtained, the targets may be sorted according to their respective distances from near to far or from far to near, and then a target that is closest to the controlled virtual character is selected and locked, and the locked target is added to the locking array.

The distance measurement unit 1020 is configured to obtain distances between targets within the preset distance range that have not been locked and the controlled virtual character. The selection unit 1030 is further configured to: select and lock a target that is closest to the controlled virtual character in the targets that have not been locked, and add the locked target to the locking array, until all the targets within the preset distance range are locked, and reset the locked targets.

Specifically, after a locked target is added to the locking array, distances between targets within the preset distance range that have not been locked and the controlled virtual character are calculated, and then a target that is closest to the controlled virtual character in the targets that have not been locked is selected and locked.

Further, in an embodiment, the foregoing apparatus for locking a target in a game application is further configured to perform the following operation: when a preset condition is satisfied, switching from locking a current target to locking a next target.

The preset condition includes any one of the following:
(1) A preset quantity of interaction times is reached.

Specifically, the preset quantity of interaction times may be set according to a need, for example, to 3 times or 5 times.
(2) A preset interaction time is reached.

Specifically, the preset interaction time may be set according to a need, for example, to 2 seconds or 5 seconds.
(3) A currently locked target is lost or disappears.

Specifically, that the currently locked disappears may be that the currently locked target dies, or the like.
(4) A switching instruction is obtained.

Specifically, gesture information input by a user is obtained, the gesture information is recognized to obtain a switching instruction, and a next target is locked according to the switching instruction.

In an embodiment, the gesture obtaining module 810 is further configured to obtain, in the operation interface of the game application, gesture information that is formed by a sliding operation on a touch screen.

Specifically, gesture information that is formed by a sliding operation on the touch screen is corresponding to a switching instruction. For example, first gesture information is formed by a sliding operation in a first direction on the touch screen, the first gesture information is recognized to obtain a corresponding first switching instruction, and a corresponding first object category is switched to according to the first switching instruction. Second gesture information is formed by a sliding operation in a second direction on the touch screen, the second gesture information is recognized to obtain a corresponding second switching instruction, and a corresponding second object category is switched to according to the second switching instruction. Similarly, correspondences between gesture information formed by multiple sliding operations and switching instructions may further be set, and each switching instruction is corresponding to an object category. The first gesture information may be sliding up, and the second gesture information may be sliding down.

Figure 11:
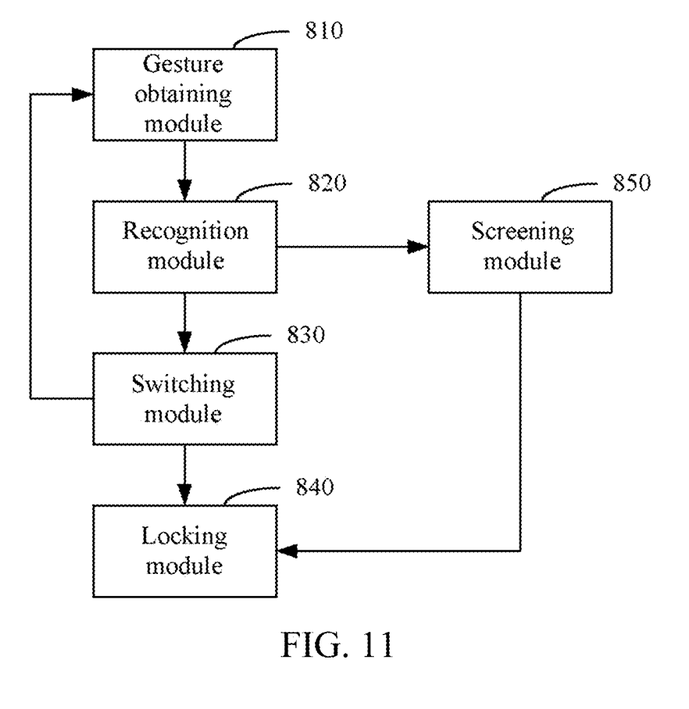
FIG. 11 is a block diagram of an internal structure of an apparatus for locking a target in a game application according to another embodiment.

FIG. 11 is a block diagram of a structure of an apparatus for locking a target in a game application according to another embodiment. As shown in FIG. 11, in addition to the gesture obtaining module 810, the recognition module 820, the switching module 830, and the locking module 840, the apparatus for locking a target in a game application further includes a screening module 850.

The gesture obtaining module 810 is further configured to: after the switching to a corresponding object category according to the switching instruction, obtain, in the operation interface of the game application, horizontal gesture information that is formed by a sliding operation on the touch screen.

The recognition module 820 is further configured to recognize the horizontal gesture information to obtain a screening instruction corresponding to the horizontal gesture information.

The screening module 850 is configured to screen out corresponding level targets from the corresponding object category according to the screening instruction.

The locking module 840 is further configured to lock a target in the level targets according to a preset rule.

Specifically, the horizontal gesture information means gesture information that is generated after the corresponding object category is switched to, and is different from gesture information for switching an object category. For example, the horizontal gesture information may be sliding a circle on the touch screen indicating level 1 or level 1 to level 5. That is, the horizontal gesture information may be corresponding to a level or be corresponding to a level range. This may be set according to a need. The horizontal gesture information may also be digital gesture information formed by sliding on the touch screen that indicates a corresponding level. For example, when "1" is formed, it indicates level 1, and when "10" is formed, it indicates level 10.

Corresponding horizontal gesture information is recognized, a screening instruction corresponding to the horizontal gesture information is obtained, corresponding level targets are screened out, and then a target in the level targets is locked according to a preset rule. The preset rule may be that shown in FIG. 9 or FIG. 10.

Figure 12:
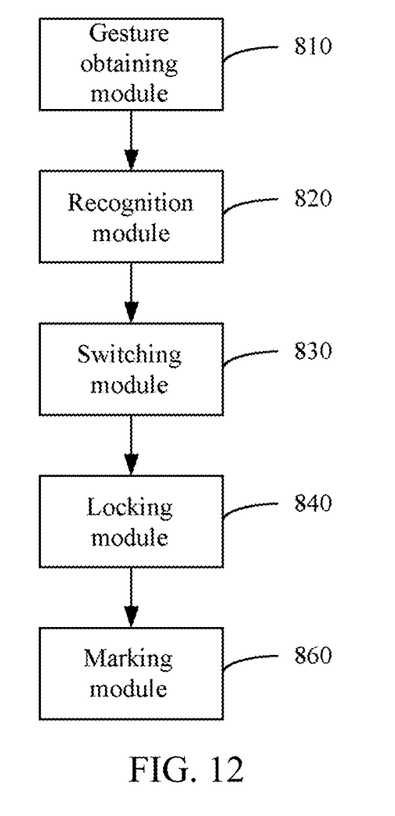
FIG. 12 is a block diagram of an internal structure of an apparatus for locking a target in a game application according to another embodiment.

FIG. 12 is a block diagram of an internal structure of an apparatus for locking a target in a game application according to another embodiment. As shown in FIG. 10, in addition to the gesture obtaining module 810, the recognition module 820, the switching module 830, and the locking module 840, the apparatus for locking a target in a game application further includes a marking module 860.

The marking module 860 is configured to: mark, by using a first indicator, a target that has been locked, and mark, by using a second indicator visually distinct from the first indicator, a target that has not been locked.

The first indicator and the second indicator may be set according to a need. For example, the first indicator may be 1 and the second indicator may be 0, or the first indicator is 0 and the second indicator is 1, or the first indicator is % and the second indicator is *.

A target that has been locked and a target that has not been locked are differentiated by using the first indicator and the second indicator visually distinct from the first indicator, bringing convenient operations and easy identification.

In another embodiment, the foregoing apparatus for locking a target in a game application may include any possible combination of the gesture obtaining module 810, the recognition module 820, the switching module 830, the locking module 840, the screening module 850, and the marking module 860.

A person of ordinary skill in the art may understand that, all or some of the processes in the foregoing methods in the embodiments may be completed by related hardware instructed by using a computer program. The program may be stored in a non-volatile computer readable storage medium. When the program is executed, the processes in the embodiments of the foregoing methods may be performed. The storage medium may be a magnetic disk, an optical disc, a read-only memory (ROM), or the like.

The embodiments described above merely explain some implementation manners of the present disclosure. Though the descriptions are specific and detailed, the embodiments should be thereby understood as limitations to the scope of the present disclosure. It should be noted that, without departing from the contemplations of the present disclosure, a person of ordinary skill in the art may still make several variations and improvements, all of which fall within the protection scope of the present disclosure. Therefore, the protection scope of the present disclosure shall subject to the accompanying claims.

What is claimed is:

1. A method for locking a target in a game application, the method comprising:
   at a terminal that has one or more processors and memory storing instructions executed by the processors:
   obtaining, by the terminal, input gesture information from a user on an operation interface of a game application, wherein the game application includes multiple object categories, each object category having one or more virtual characters displayed on the operation interface;
   recognizing, by the terminal, the gesture information to obtain a switching instruction of the game application corresponding to the gesture information;
   selecting, by the terminal, an object category of virtual characters according to the switching instruction;
   locking, by the terminal, a target virtual character in the object category according to a preset rule and performing, by the terminal, an operation on the target virtual character; and
   after performing the operation, automatically repeating, by the terminal, the locking and the performing operations on a next target virtual character in the object category until finishing a last virtual character in the object category.

2. The method according to claim 1, wherein the operation of locking a target virtual character in the object category according to a preset rule and performing an operation on the target virtual character, further comprises:
   obtaining, by the terminal, target virtual characters in the object category within a preset distance range from a controlled virtual character;
   obtaining, by the terminal, a respective distance between each of the target virtual characters and the controlled virtual character; and
   sequentially locking, by the terminal, the target virtual characters in the object category according to their respective distances from near to far and performing the operation on the target virtual character.

3. The method according to claim 1, wherein the operation of locking a target virtual character in the object category according to a preset rule and performing an operation on the target virtual character, further comprises:
   obtaining, by the terminal, target virtual characters in the object category within a preset distance range from a controlled virtual character;
   obtaining, by the terminal, a respective distance between each of the target virtual characters and the controlled virtual character;
   selecting and locking, by the terminal, a target virtual character that is closest to the controlled virtual character in the object category, and adding, by the terminal, the locked target virtual character to a locking array; and
   automatically repeating, by the terminal, the obtaining, selecting, and locking operations until no target virtual character within the preset distance range remains unlocked, and resetting the locked target virtual characters in the locking array by unlocking all of the locked target virtual characters.

4. The method according to claim 1, wherein the operation of automatically repeating the locking and the performing operations on a next target virtual character in the object category until finishing a last virtual character in the object category, further comprises:
   after reaching a preset number of interaction times on the current target virtual character, switching, by the terminal, from locking the current target virtual character to locking the next target virtual character in the object category.

5. The method according to claim 1, wherein the operation of automatically repeating the locking and the performing operations on a next target virtual character in the object category until finishing a last virtual character in the object category, further comprises:

after the current locked target virtual character disappears from the preset distance range, switching, by the terminal, from locking the current target virtual character to locking the next target virtual character in the object category.

6. The method according to claim 1, further comprising:
marking, using a first indicator by the terminal, a target virtual character that has been locked, and marking, using a second indicator by the terminal visually distinct from the first indicator, a target virtual character that has not been locked.

7. The method according to claim 1, wherein the operation of obtaining input gesture information from a user on an operation interface of a game application comprises:
obtaining, by the terminal in the operation interface of the game application, gesture information that is formed by a sliding operation on a touch screen of the terminal.

8. The method according to claim 7, further comprising:
after selecting an object category of virtual characters according to the switching instruction:
obtaining, by the terminal in the operation interface of the game application, horizontal gesture information that is formed by a sliding operation on the touch screen;
recognizing, by the terminal, the horizontal gesture information to obtain a screening instruction corresponding to the horizontal gesture information;
screening out, by the terminal, corresponding level target virtual characters from the object category according to the screening instruction; and
locking, by the terminal, a target virtual character in the level target virtual characters according to a preset rule.

9. A terminal, comprising:
one or more processors;
memory and
one or more programs stored in the memory, wherein the one or more program, when executed by the one or more processors, cause the terminal to perform a plurality of operations including:
obtaining input gesture information from a user on an operation interface of a game application, wherein the game application includes multiple object categories, each object category having one or more virtual characters displayed on the operation interface;
recognizing the gesture information to obtain a switching instruction of the game application corresponding to the gesture information;
selecting an object category of virtual characters according to the switching instruction;
locking a target virtual character in the object category according to a preset rule and performing an operation on the target virtual character; and
after performing the operation, automatically repeating the locking and the performing operations on a next target virtual character in the object category until finishing a last virtual character in the object category.

10. The terminal according to claim 9, wherein the operation of locking a target virtual character in the object category according to a preset rule and performing an operation on the target virtual character, further comprises:
obtaining target virtual characters in the object category within a preset distance range from a controlled virtual character;
obtaining a respective distance between each of the target virtual characters and the controlled virtual character; and
sequentially locking the target virtual characters in the object category according to their respective distances from near to far and performing the operation on the target virtual character.

11. The terminal according to claim 9, wherein the operation of locking a target virtual character in the object category according to a preset rule and performing an operation on the target virtual character, further comprises:
obtaining target virtual characters in the object category within a preset distance range from a controlled virtual character;
obtaining a respective distance between each of the target virtual characters and the controlled virtual character;
selecting and locking a target virtual character that is closest to the controlled virtual character in the object category, and adding the locked target virtual character to a locking array; and
automatically repeating the obtaining, selecting, and locking operations until no target virtual character within the preset distance range remains unlocked, and resetting the locked target virtual characters in the locking array by unlocking all of the locked target virtual characters.

12. The terminal according to claim 9, wherein the operation of automatically repeating the locking and the performing operations on a next target virtual character in the object category until finishing a last virtual character in the object category, further comprises:
after reaching a preset number of interaction times on the current target virtual character, switching from locking the current target virtual character to locking the next target virtual character in the object category.

13. The terminal according to claim 9, wherein the operation of automatically repeating the locking and the performing operations on a next target virtual character in the object category until finishing a last virtual character in the object category, further comprises:
after the current locked target virtual character disappears from the preset distance range, switching from locking the current target virtual character to locking the next target virtual character in the object category.

14. The terminal according to claim 9, wherein the plurality of operations further comprise:
marking, by using a first indicator, a target virtual character that has been locked, and marking, by using a second indicator visually distinct from the first indicator, a target virtual character that has not been locked.

15. The terminal according to claim 9, wherein the operation of obtaining input gesture information from a user on an operation interface of a game application comprises:
obtaining, in the operation interface of the game application, gesture information that is formed by a sliding operation on a touch screen of the terminal.

16. The terminal according to claim 15, wherein the plurality of operations further comprise:
after selecting an object category of virtual characters according to the switching instruction:
obtaining, in the operation interface of the game application, horizontal gesture information that is formed by a sliding operation on the touch screen;
recognizing the horizontal gesture information to obtain a screening instruction corresponding to the horizontal gesture information;

screening out corresponding level target virtual characters from the object category according to the screening instruction; and locking a target virtual character in the level target virtual characters according to a preset rule.

17. A non-transitory computer readable storage medium storing one or more programs, that are configured to be executed by one or more processors of a terminal and cause the terminal to perform a plurality of operations including:

obtaining input gesture information from a user on an operation interface of a game application, wherein the game application includes multiple object categories, each object category having one or more virtual characters displayed on the operation interface;

recognizing the gesture information to obtain a switching instruction of the game application corresponding to the gesture information;

selecting an object category of virtual characters according to the switching instruction;

locking a target virtual character in the object category according to a preset rule and performing an operation on the target virtual character; and after performing the operation, automatically repeating the locking and the performing operations on a next target virtual character in the object category until finishing a last virtual character in the object category.

18. The non-transitory computer readable storage medium according to claim 17, wherein the operation of locking a target virtual character in the object category according to a preset rule and performing an operation on the target virtual character, further comprises:

obtaining target virtual characters in the object category within a preset distance range from a controlled virtual character;

obtaining a respective distance between each of the target virtual characters and the controlled virtual character; and sequentially locking the target virtual characters in the object category according to their respective distances from near to far and performing the operation on the target virtual character.

19. The non-transitory computer readable storage medium according to claim 17, wherein the operation of locking a target virtual character in the object category according to a preset rule and performing an operation on the target virtual character, further comprises:

obtaining target virtual characters in the object category within a preset distance range from a controlled virtual character;

obtaining a respective distance between each of the target virtual characters and the controlled virtual character;

selecting and locking a target virtual character that is closest to the controlled virtual character in the object category, and adding the locked target virtual character to a locking array; and automatically repeating the obtaining, selecting, and locking operations until no target virtual character within the preset distance range remains unlocked, and resetting the locked target virtual characters in the locking array by unlocking all of the locked target virtual characters.

* * * * *